N. C. WOODWARD.
SPRING TIRE.
APPLICATION FILED OCT. 2, 1920.

1,390,948.

Patented Sept. 13, 1921.

Norman C. Woodward
INVENTOR

BY Victor J. Evans
ATTORNEY

WITNESS

UNITED STATES PATENT OFFICE.

NORMAN C. WOODWARD, OF HORNELL, NEW YORK.

SPRING-TIRE.

1,390,948. Specification of Letters Patent. Patented Sept. 13, 1921.

Application filed October 2, 1920. Serial No. 414,170.

*To all whom it may concern:*

Be it known that I, NORMAN C. WOODWARD, a citizen of the United States, residing at Hornell, in the county of Steuben and State of New York, have invented new and useful Improvements in Spring-Tires, of which the following is a specification.

This invention relates to resilient tires and has for its object the provision of a tire which attains resilience through the provision of a series of springs mounted between two slidably associated channeled rim members, the outer one of which carries a cushion tire, the advantage of this structure being that all annoyance caused by punctures and blow-outs common to pneumatic tires is entirely eliminated.

A very important object of the present invention is the provision of novel means for securing the springs to the channeled rim members.

An additional object is the provision of a structure of this character which will be simple and inexpensive in manufacture, which may be formed for use upon an ordinary wheel, which will be highly efficient and durable in use, and a general improvement in the art.

With the above and other objects and advantages in view, the invention consist in the details of construction to be hereinafter more fully described and claimed and illustrated in the accompanying drawings in which—

Figure 1:
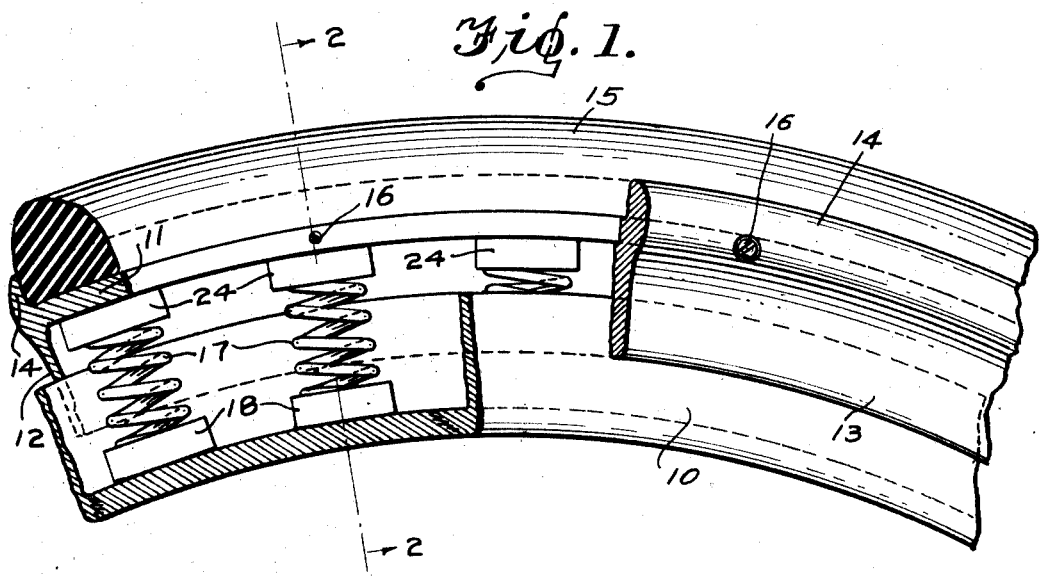
Figure 2:
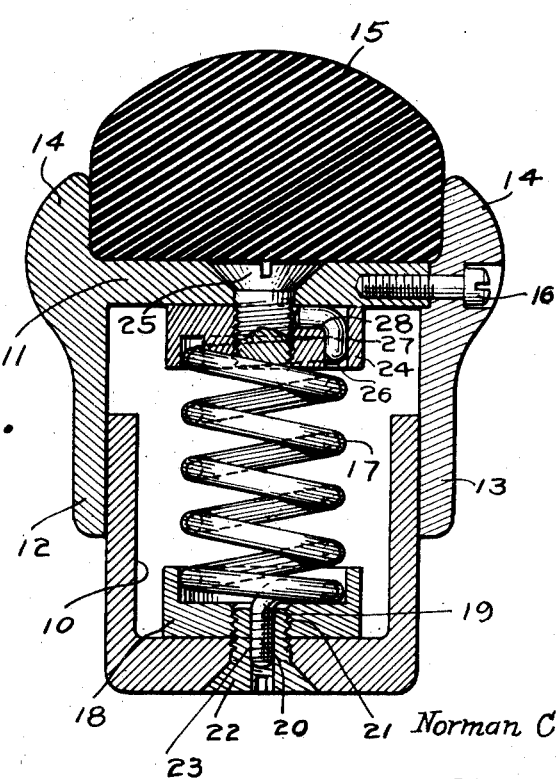

Figure 1 is a fragmentary side elevation of a tire constructed in accordance with my invention, parts being broken away and in section, and Fig. 2 is a cross sectional view.

Referring more particularly to the drawings, I have shown my tire as comprising a channeled inner rim member 10 and a channeled outer rim member 11 having side flanges 12 and 13 overlapping and slidably engaging the sides of the rim member 10. At its outer edge the channeled member 11 carries flanges 14 which serve as retaining means for the cushion tire 15. The side flange member 13 is removable and is held in place by suitable bolts or screws 16 passing through it and into the channeled member 11.

In order to attain resilience, I provide a plurality of coil springs 17 which are disposed between the channeled members 10 and 11 and these spring members are held in position by novel means to be described.

In order to mount the springs between the rim members, I provide a plurality of socket members 18 which are disposed against the outer periphery of the inner rim member 10 and the inner ends of the springs are seated within these socket members. The inner end of each spring is extended axially of the spring, as shown at 19, and the extremity is threaded, as indicated at 20. This extending end 19 of the spring passes through a threaded opening 21 formed in the socket member. In order to secure the inner ends of the springs, I provide a screw 22 threaded into the opening 21 and having a central threaded bore 23 which screws onto the threaded extremity 20 of the spring.

In order to secure the outer ends of the springs, I provide a plurality of nut members 24 disposed against the inner periphery of the outer rim member 11 and secured in position by screws 25 having their heads counter-sunk into the outer rim member. Each of these nut members 24 has its inner face formed with a circular channel 26 into which leads a passage 27 which is L-shaped, as shown. The outer convolution of each spring is engaged within the channel 26 with the extremity of the spring inserted through the passage 27 and upset or bent laterally, as shown at 28.

In the use of the tire it will be seen that it may be used upon wheels of different constructions and does not itself require a specific supporting wheel structure. In the use it will be apparent that the outer rim member slides with respect to the inner rim member, the springs 17 affording resilience and permitting the necessary radial movement of the rim members.

While I have shown and described the preferred embodiment of my invention, it is of course to be understood that I reserve the right to make such changes in the form, construction, and arrangement of parts as will not depart from the spirit of the invention of the scope of the subjoined claims.

Having thus described my invention, I claim.

1. A spring tire comprising slidably associated inner and outer channeled rim members, a plurality of coil springs disposed between said rim members, means for securing the outer ends of the springs to the outer rim member comprising a series of nut members secured at spaced intervals upon the inner periphery of the outer rim member and each formed with a circular channel and an L-shaped passage leading thereinto, the outermost convolution of each spring being disposed within the channel with the extremity of the spring disposed within said passage and laterally bent for conforming engagement therein, and means for securing the inner ends of the spring members to the channel member.

2. A spring tire comprising inner and outer channeled rim members slidably associated, a plurality of springs interposed between said rim members, means for securing the outer ends of the springs to the outer rim member, and means for securing the inner ends of the springs to the inner rim members comprising members disposed upon the outer periphery of the inner rim member at spaced intervals and each formed with a socket and threaded bore leading centrally thereinto, the innermost convolution of each spring being engaged within a socket with the terminal of the spring extending axially thereof and passing through said bore, and a screw passing through the inner rim member and threaded into said bore and having a central bore for the passage of the terminal of the spring, said extremity of the spring being threaded and the bore of said screw being threaded and engaged upon the threaded end of the spring.

In testimony whereof I affix my signature.

NORMAN C. WOODWARD.